United States Patent [19]
Bell, Jr.

[11] 3,712,336
[45] Jan. 23, 1973

[54] AIR TRANSFER LINE

[76] Inventor: William Roland Bell, Jr., 800 25th Street, Snyder, Tex. 79549

[22] Filed: Feb. 18, 1971

[21] Appl. No.: 116,424

[52] U.S. Cl. ............ 137/613, 137/231, 137/614.04, 251/149.7
[51] Int. Cl. .............................................. F16k 15/20
[58] Field of Search .137/231, 614.04, 613; 285/239, 285/240; 152/415; 251/149.7

[56] References Cited

UNITED STATES PATENTS

| | | | |
|---|---|---|---|
| 2,663,348 | 12/1953 | Farris | 152/415 |
| 1,996,855 | 4/1935 | Cheswright | 285/239 |
| 748,301 | 12/1903 | Nicholls | 285/240 |
| 1,390,283 | 9/1921 | Edelmann | 137/231 |

FOREIGN PATENTS OR APPLICATIONS 876,560  9/1961  Great Britain.....................152/415

Primary Examiner—Harold W. Weakley
Attorney—Charles W. Coffee

[57] ABSTRACT

A hose with a standard automobile tire valve in each end is used to transfer air from an inflated tire to a flat tire. The standard valve in each end of the hose prevents loss of the air and also depresses the stem of each tire valve. The rubber tube is soft at each end to flow under air pressure, but is confined by a layer of fabric.

1 Claim, 4 Drawing Figures

PATENTED JAN 23 1973 3,712,336

WILLIAM ROLAND
BELL Jr.
INVENTOR.

BY
Atty.

AIR TRANSFER LINE

CROSS-REFERENCE TO RELATED APPLICATIONS

I previously filed an informal patent application on Jan. 21, 1969, Ser. No. 792,726 (now abandoned), disclosing many features of this invention.

BACKGROUND OF THE INVENTION

1. Field of the Invention

This invention relates to fluid handling and more specifically to transferring air from a full tire to an empty tire and the attachments to the valve of each tire.

2. Description of the Prior Art

Previous workers in the art have suggested that inflated and deflated tires be connected together to transfer air from one to the other.

Samples of the prior work are shown in JENNE, U.S. Pat. No. 2,237,559. JENNE shows a cam device for depressing the valve stem. A one-way valve is provided at one side only.

Also, French Pat. No. 984,569, issued in 1951, shows such a device with a valve opener and a one-way valve.

Also, SCHRODER, U.S. Pat. No. 1,301,508, shows a chuck attachment for an automobile valve having a valve opener.

SUMMARY OF THE INVENTION

1. New and Different Function

Even with modern tires on automobiles, sometimes they go flat. Often times this occurs away from stations where mechanics are unavailable to fix and repair the damage. Therefore, it is desirable to be able to partially inflate the flat tire from a full tire. One of the situations where this often occurs in on auxiliary equipment such as boat trailers or camping trailers or other equipment which is attached to an automobile. In this case often the volume of the auxiliary tire is very small with respect to the automobile tire; therefore, the auxiliary tire may be inflated to its full amount from the principal tire without appreciably deflating the principal tire.

However, for such a system as this to be practical, it is necessary that advance preparation be made. If advance preparation is made, the tire inflator or transfer line must be purchased in advance. If it is to be purchased in advance, it is purchased at a time when it is not needed; therefore, it is felt that the purchase price must be extremely low as people will not wish to pay a large amount for a contingency which might not occur.

There is a definitely limited amount of air to be used and therefore, extreme care must be taken so as to not permit any of the air to escape, otherwise, the operation would be completed with two flat tires, leaving the person in wore condition than when he started.

I have solved this problem by providing an extremely inexpensive device, which uses the standard valve units, which are manufactured by the millions to be used in standard automobile tires. This is important, as pointed out above, because by using these standard units, although they are more complex than some of the prior art, the price is extremely low. Also, the standard valve has been proven efficient in preventing the escape of air. Therefore, it is possible to use a stop valve on both ends of the tube so there is no loss of air. These devices operate as a valve opener so the air is transferred efficiently from one tire to the other. If one or the other is connected or disconnected, the operation is almost fool proof because there is a minimum of air loss. With these devices, the ends of the tube are entirely interchangeable and there is no need to remember or to have marked that one end goes on the flat tire and the other end goes on the inflated tire, or otherwise.

2. Objects of the Invention

An object of this invention is to inflate a flat tire from an inflated tire.

Other objects are to achieve the above with a device that is sturdy, compact, durable, lightweight, simple, safe, efficient, versatile, and reliable, yet inexpensive and easy to manufacture, install, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
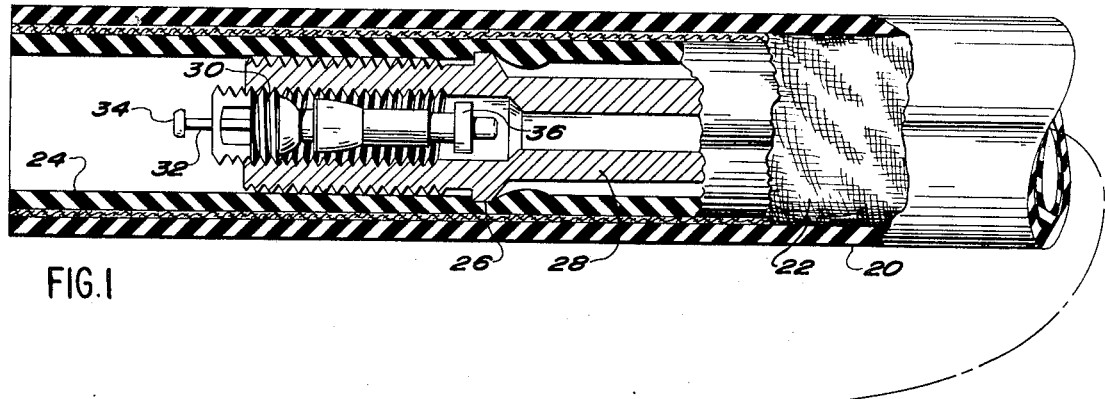
FIG. 1 is a partial sectional view of a hose according to this invention, showing one end connected to a tire valve with the hose broken between the ends for clarity.
Figure 2:
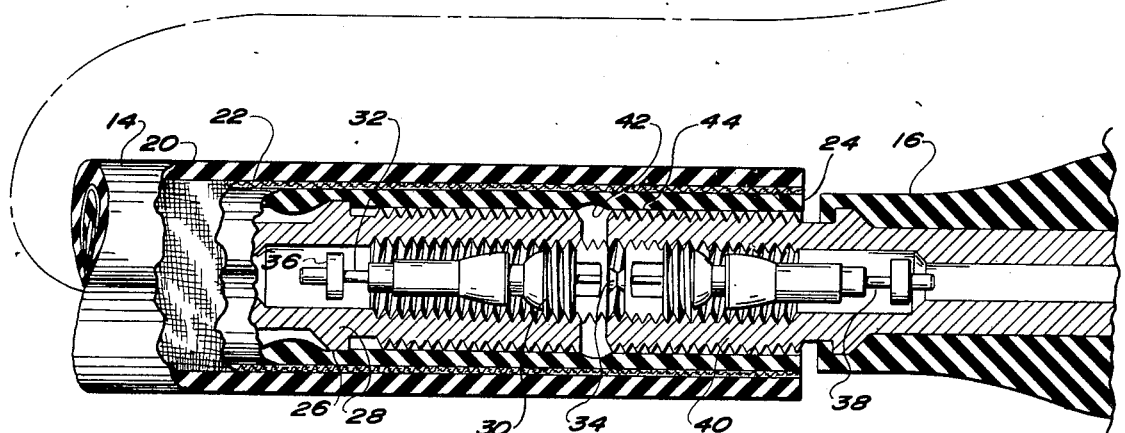
FIG. 2 is an illustration of two tires, one inflated and one flat with the invention attached to it.
Figure 3:
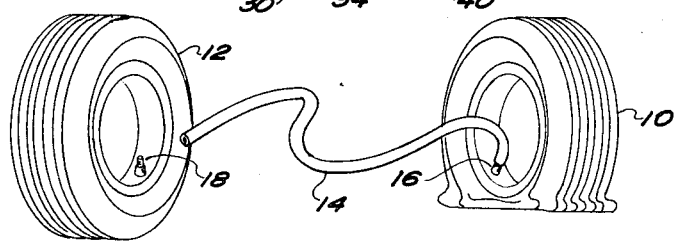
FIG. 3 is a view similar to FIG. 2 with the hose according to this invention connected with both.
Figure 4:
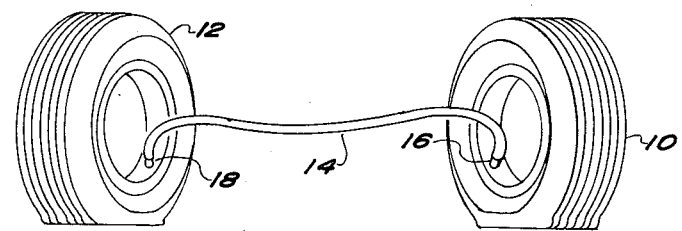
FIG. 4 is a view showing each of the tires half inflated with the hose according to this invention disconnected from each.

Referring to FIGS. 2, 3, and 4, the use of the invention may be seen. There may be seen deflated or flat tire 10 and an inflated tire 12. By connecting one end of long conduit or hose 14 to valve 16 of the flat tire 10 and one end of the hose 14 to valve 18 of the inflated tire 12, it may be seen that it is possible to half inflate both tires. Then, the hose 14 can be removed from each of the valves 16 and 18 so each tire is half inflated; then, the traveler is ready to journey to a station where a mechanic can repair the previously deflated tire 10.

The hose 14 is composed of three layers. Outer layer 20 of rubber protects an inner layer of woven fabric 22. This woven fabric is not expansible, i.e., it is not appreciably elastic, so essentially it has a fixed diameter. Within the fabric 22 there is another strata or layer of rubber which is the inside layer 24 of rubber. The inside layer 24 of rubber is, as characteristic of rubber, plastic or flexible or deformable. Therefore, certain protuberances or flanges 26 upon rigid tube 28 may be fitted within the hose 14 and the rubber 24 on the inside will flow to either side of the flange 26, but the fabric layer 22 will not deform or stretch. It will be noted that the rigid tube 28 is a standard tube from a standard automobile tire valve. Not only is there the outer tube 28, but there is valve seat or valve seat assembly 30 which is threaded coaxially within the tube 28. The valve stem 32 is mounted coaxially within the seat 30 and on one end of the valve stem 32 there is operator extension 34, which extends beyond the valve seat 30 and on the other end is valve disc 36, which seats upon the seat proper to form the pneumatic seal to prevent air from passing.

The hose 14 is a rubber tube which has a yieldable interior in the form of the inside rubber layer 24 and is surrounded by limiting non-expansible fabric layer in the form of the fabric 22. If the economies of manufacture indicate it is desirable to do so, a different hose 14 could be used as the flexible conduit between the ends rather than having the identical structure of the hose from one end to the other.

The valve stem operator extension 34 extends not only past the valve seat 30, but also beyond the rigid tube 28 itself. However, when the rigid tube 28, forming the outside portion of the valve mechanism, is placed within the rubber hose 14, it is placed well within the hose. When the rubber hose is placed over the end of the valve 16 of the tire 10, the tube extends well over the valve before the operator extension 34 contacts valve stem 38 of the valve 16. When the valve stem 34 depresses the valve stem 38, both valves are open so there is a free flow of air. If there is air within the tire 10, it cannot escape from the conduit or hose 14 because of the valve mechanism within the other end of the hose 14.

There is that area between the rigid tube 28 and tube 40 of the valve 16 which is designated as area 42. This area is exposed to the pneumatic pressure within the hose 14 and within the tire to which the hose is attached. Assuming there is air pressure within the tube 14, it may be seen that this air pressure will deform the rubber of the yieldable interior 24. Inasmuch as the rubber is not actually compressed, but merely flows to either side, it flows to that adjacent area 44 so it causes a firm contact between the rubber hose 14 and the valve 16 of the tire 10 to be inflated. Thereafter, the other end of the tube is attached to the valve 18 of the tire 12, which as considerable pressure in it. After the pressure in the two tires has equalized, the hose is removed from one tire. As soon as the hose is removed, operator extension 34 removes the pressure from valve stem 38 of the valve 16 upon the tire 10 and this valve closes, preventing any further loss of air.

When the valves are open the air cannot escape because of the seal between the hose and the valve 16. If the hose is not firmly in place, each valve is closed.

Therefore it may be seen that I have provided an efficient means for transferring air from one tire to another, which means is extremely economical in construction and practically fool proof in the prevention of the loss of air.

The embodiment shown and described above it only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. In an inflating device having
   a. a long conduit with
   b. a valve mechanism on each end for connecting onto the valve of a tire to transfer air from one tire to another,
   c. the improvement comprising:
   d. each of said valve mechanisms including a standard automobile tire valve having,
      i. a rigid tube,
      ii. a valve seat threaded coaxially within the tube,
      iii. a valve stem mounted coaxially within the valve seat,
      iv. said stem extending beyond the seat on one side with an operator extension,
      v. said operator extension extending beyond the rigid tube to open a valve of a tire, and
      vi. said stem extending beyond the seat on the other side with a valve disc,
   e. said rigid tube being telescoped within a rubber tube which forms the long conduit and has
      i. a yieldable interior surrounded by a
      ii. limiting non-expandable fabric layer so that when the rubber tube is telescoped over a valve of a tire, then the rubber tube in the area between the valve of the tire and rigid tube is exposed to air pressure, thus the rubber flows from said area to squeeze the rubber around the valve of the tire because of the confinement of the fabric.

* * * * *